United States Patent
Nakamura

(10) Patent No.: US 6,229,643 B1
(45) Date of Patent: *May 8, 2001

(54) OPTICAL FIBER AMPLIFIER SURGE PROTECTIVE APPARATUS

(75) Inventor: Keiji Nakamura, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,610

(22) Filed: Jan. 13, 1999

(30) Foreign Application Priority Data

Jan. 14, 1998 (JP) .................................................. 10-020337

(51) Int. Cl.$^7$ ................................. H01S 3/10; H04B 9/00
(52) U.S. Cl. .............................................. 359/341; 359/177
(58) Field of Search .................................... 359/161, 174, 359/177, 194, 337, 341

(56) References Cited

U.S. PATENT DOCUMENTS

| | | | |
|---|---|---|---|
| 5,570,227 | * 10/1996 | Nabeyama et al. | 359/337 |
| 5,589,975 | * 12/1996 | Nakamura et al. | 359/341 |
| 5,701,195 | * 12/1997 | Chikama | 359/177 |
| 5,923,463 | * 7/1999 | Hamada | 359/341 |

FOREIGN PATENT DOCUMENTS

| | | |
|---|---|---|
| 5226747 | * 9/1993 | (JP) . |
| 5-336046 | 12/1993 | (JP) . |
| 6152034 | * 5/1994 | (JP) . |
| 6-132895 | 5/1994 | (JP) . |
| 4216452 | * 8/1994 | (JP) . |
| 8-331048 | 12/1996 | (JP) . |
| 9-130328 | 5/1997 | (JP) . |

* cited by examiner

Primary Examiner—Nelson Moskowitz
(74) Attorney, Agent, or Firm—McGinn & Gibb, PLLC

(57) ABSTRACT

An optical fiber amplifier surge protective apparatus includes an optical branch unit, an optical delay circuit, a light input hit detecting circuit, a compensation optical signal generating circuit, and an optical multiplexer. The optical branch unit branches an optical signal input from an optical fiber line into a main optical signal on a main optical path and a branch optical signal on a branch optical path. The optical delay circuit delays the main optical signal on the main optical path. The light input hit detecting circuit monitors the level of the branch optical signal on the branch optical path to detect an optical fiber line hit. The compensation optical signal generating circuit generates a compensation optical signal having a wavelength different from that of the optical signal input when the light input hit detecting circuit detects the optical fiber line hit. The optical multiplexer multiplexes the compensation optical signal from the compensation optical signal generating circuit and the delayed main optical signal from the optical delay circuit.

15 Claims, 2 Drawing Sheets

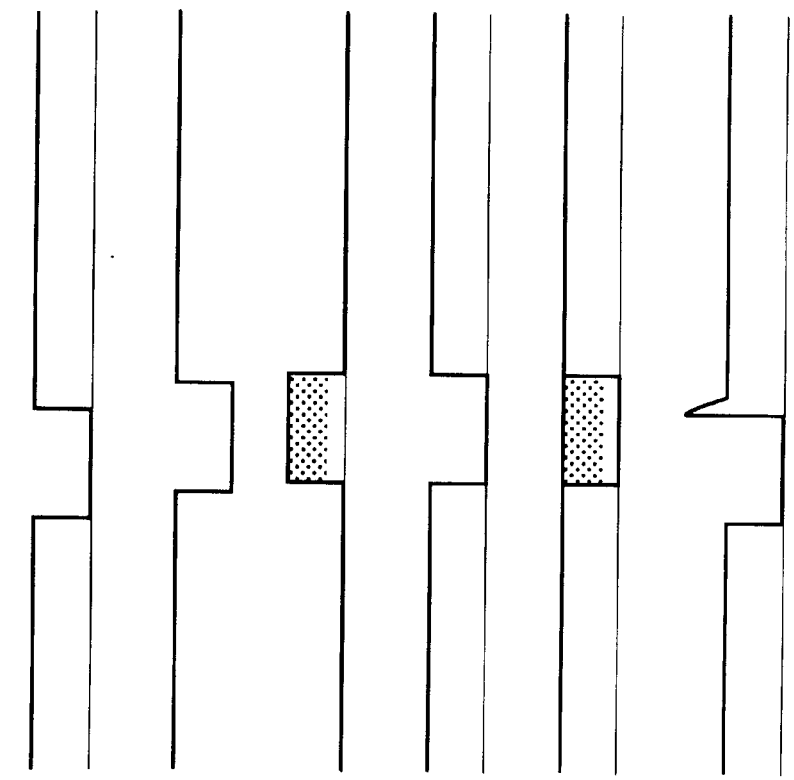
FIG. 2A  OPTICAL SIGNAL INPUT 1
FIG. 2B  WAVEFORM OF LIGHT INPUT HIT DETECTING CIRCUIT 7
FIG. 2C  OUTPUT FROM OPTICAL SIGNAL GENERATING CIRCUIT 8
FIG. 2D  OUTPUT FROM OPTICAL DELAY CIRCUIT 3
FIG. 2E  OUTPUT FROM OPTICAL MULTIPLEXER 4
FIG. 2F  GENERATION OF SURGE IN PRIOR ART

OPTICAL FIBER AMPLIFIER SURGE PROTECTIVE APPARATUS

BACKGROUND OF THE INVENTION

The present invention relates to an optical fiber amplifier surge protective apparatus for complementing a hit of an optical signal by monitoring the level of a branch optical signal branched from the optical signal.

In a wave length division multiplexing (WDM) optical transmission system using an optical fiber amplifier, when a hit occurs on an optical fiber line, and the line recovers from the continuous hit, an optical signal is abruptly input to the optical fiber amplifier in a no-signal state to generate an optical surge. Such optical surge is a phenomenon in which energy stored by pumping light during a no-signal state is induced and emitted at once by a newly input optical signal after the recovery of the optical fiber line. This optical surge damages optical components such as a light-receiving element.

SUMMARY OF THE INVENTION

It is an object of the present invention to provide an optical fiber amplifier surge protective apparatus for suppressing an optical surge upon occurrence of a hit on an optical fiber line.

To achieve the above object, according to the present invention, there is provided an optical fiber amplifier surge protective apparatus comprising optical branch means for branching an optical signal input from an optical fiber line into a main optical signal on a main optical path and a branch optical signal on a branch optical path, optical delay means for delaying the main optical signal on the main optical path, light input hit detecting means for monitoring a level of the branch optical signal on the branch optical path to detect an optical fiber line hit, compensation optical signal generating means for generating a compensation optical signal having a wavelength different from a wavelength of the optical signal input when the light input hit detecting means detects the optical fiber line hit, and optical multiplexing means for multiplexing the compensation optical signal from the compensation optical signal generating means and the delayed main optical signal from the optical delay means.

BRIEF DESCRIPTION OF THE DRAWINGS

FIGS. 2A to 2E are waveform charts of respective parts for explaining operation of the optical fiber amplifier surge protective circuit in FIG. 1, and FIG. 2F is a waveform chart showing an optical surge in the prior art.

DESCRIPTION OF THE PREFERRED EMBODIMENT

Figure 1:
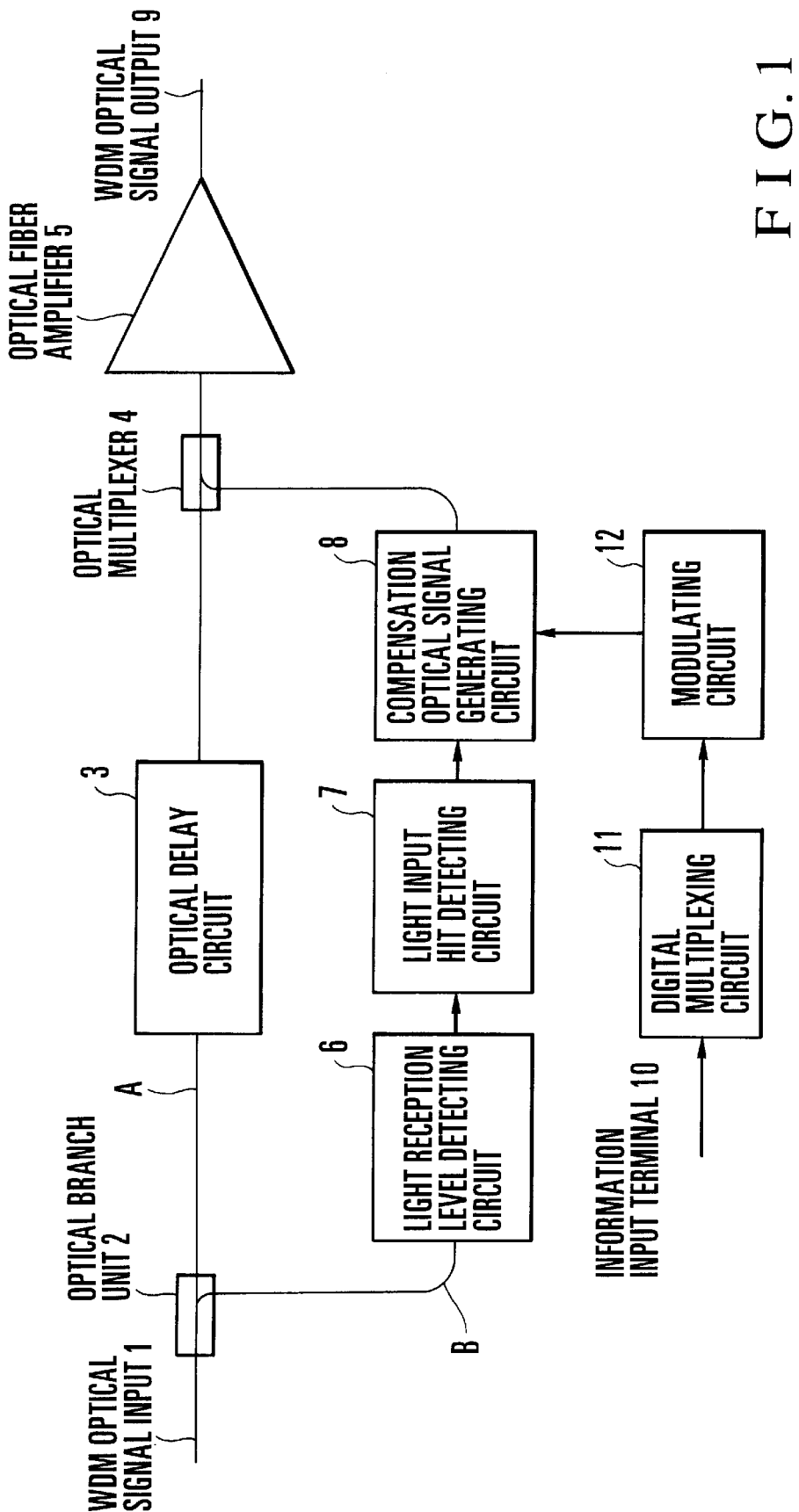
FIG. 1 is a block diagram showing an optical fiber amplifier surge protective circuit according to an embodiment of the present invention.

The present invention will be described in detail below with reference to the accompanying drawings.

FIG. 1 shows an optical fiber amplifier surge protective circuit according to an embodiment of the present invention. In FIG. 1, a WDM optical signal input (to be referred to as an optical signal input hereinafter) 1 is transmitted to an optical branch unit 2 via an optical fiber line (not shown), and branched into main and branch optical signals by the optical branch unit 2. The main optical signal from the optical branch unit 2 is transmitted to a main optical path A, while the branch optical signal is transmitted to a branch optical path B.

An optical delay circuit 3 and an optical multiplexer 4 are sequentially inserted in the main optical path A. The optical delay circuit 3 delays the phase of the main optical signal passing through the main optical path A. The delay amount of the optical delay circuit 3 is adjusted so as not to generate a hit between a compensation optical signal (to be described below) to be multiplexed by the optical multiplexer 4, and a multiplexed optical signal.

On the branch optical path B, a light reception level detecting circuit 6, a light input hit detecting circuit 7, and a compensation light generating circuit 8 are sequentially arranged between the optical branch unit 2 and optical multiplexer 4.

The light reception level detecting circuit 6 detects the level of the branch optical signal branched to and passing through the branch optical path B, and transmits an output to the light input hit detecting circuit 7. The light input hit detecting circuit 7 always monitors the level of the branch optical signal, i.e., the level of the output signal from the light reception level detecting circuit 6. If the output level of the light reception level detecting circuit 6 becomes a predetermined value or less, the light input hit detecting circuit 7 determines an optical fiber line hit has occurred and outputs a hit detection signal to the compensation light generating circuit 8. The compensation light generating circuit 8 generates and outputs a compensation optical signal to the optical multiplexer 4 upon reception of the hit detection signal from the light input hit detecting circuit 7.

The compensation optical signal from the compensation light generating circuit 8 is a light output having a wavelength $\lambda 1$ different from the wavelength of the main optical signal (optical signal input) on the main optical path A. This compensation optical signal and the main optical signal delayed by the optical delay circuit 3 are multiplexed (added) by the optical multiplexer 4. An output from the optical multiplexer 4 is input to an optical fiber amplifier 5, and a WDM optical signal output 9 from the optical fiber amplifier 5 is transmitted to the optical fiber line.

Operation of the optical fiber surge protective circuit having this arrangement will be explained with reference to waveform charts in FIGS. 2A to 2F.

When a continuous hit occurs on the optical fiber line during which no signal to the optical amplifier 5, is input and then the optical fiber line recovers from the hit and the amplifier abruptly receives the optical signal input 1, and an optical surge is generated in a conventional optical transmission apparatus, as shown in FIG. 2F. This embodiment can suppress such an optical surge.

A normal state wherein no hit occurs on the optical fiber line will be first explained. The optical signal input 1 having transmitted through a normal optical fiber line is input to the optical branch unit 2 and branched into main and branch optical signals by the optical branch unit 2. The main optical signal branched to the main optical path A is delayed by the optical delay circuit 3 and input to the optical multiplexer 4.

The branch optical signal branched to the branch optical path B under goes level detection by the light reception level detecting circuit 6, and the detection result is output to the light input hit detecting circuit 7. The light input hit detecting circuit 7 always monitors the output level of the light reception level detecting circuit 6 to indirectly monitor the light reception level of the optical signal input 1 passing through the optical fiber line. In a normal state in which no hit occurs on the optical fiber line, the light input hit detecting circuit 7 does not generate any low-level output signal like the one shown in FIG. 2B to the compensation light generating circuit 8.

In this state, the compensation light generating circuit 8 does not generate any compensation optical signal having a wavelength different from that of an optical signal input. The optical multiplexer 4 does not receive any compensation optical signal and thus transmits only the main optical signal having passed through the main optical path A, i.e., the optical signal input 1 as the WDM optical signal 9 to the optical fiber line via the optical fiber amplifier 5.

The case in which a hit occurs on the optical fiber line will be described. If a hit occurs on the optical fiber line while the optical signal input 1 is input to the optical branch unit 2 and branched to the main and branch optical paths A and B, the optical signal input 1 is omitted during the hit period, as shown in FIG. 2A. This omission is detected by the light reception level detecting circuit 6 on the branch optical path B, and the detection output is sent to the light input hit detecting circuit 7.

The light input hit detecting circuit 7 receives the detection output from the light reception level detecting circuit 6 to always monitor the level of the optical signal input 1. More specifically, if the light reception level detecting circuit 6 detects a hit on the optical fiber line, the level of the output signal falls. The low output level of the light reception level detecting circuit 6 decreases the level of the input signal to the light input hit detecting circuit 7 and also the level of the output signal from the light input hit detecting circuit 7, as shown in FIG. 2B.

Upon reception of the low-level output signal from the light input hit detecting circuit 7, i.e., the detection signal from the light input hit detecting circuit, the compensation light generating circuit 8 generates a compensation optical signal having the wavelength λ1 different from the wavelength of the optical signal input 1, as shown in FIG. 2C. During generation of the compensation optical signal, the output signal from the light input hit detecting circuit 7 is at low level, i.e., a hit occurs on the optical fiber line. The compensation optical signal output from the compensation light generating circuit 8 is input to the optical multiplexer 4.

The output signal from the light input hit detecting circuit 7 and the compensation optical signal are generated with a small delay from the generation point of a hit on the optical fiber line that is shown in FIG. 2A.

The optical multiplexer 4 receives the main optical signal (FIG. 2D) having passed through the main optical path A and delayed by the optical delay circuit 3. The optical multiplexer 4 multiplexes (adds) the two input signals, i.e., the main optical signal delayed by the optical delay circuit 3 and the compensation optical signal from the compensation light generating circuit 8.

At this time, the delay amount of the main optical signal by the optical delay circuit 3 is adjusted so as not to generate any hit on the optical fiber line upon multiplexing by the optical multiplexer 4.

Accordingly, the low-level period of the output signal from the light input hit detecting circuit 7, the generation period of the output signal from the compensation light generating circuit 8, and the low-level period of the main optical signal delayed by the optical delay circuit 3 that results from a hit completely coincide with each other, as shown in FIGS. 2B to 2D.

The optical multiplexer 4 multiplexes the compensation optical signal from the compensation light generating circuit 8 and the output signal from the optical delay circuit 3 to bury the low-level period of the main optical signal output from the optical delay circuit 3 with the compensation optical signal like the one shown in FIG. 2C. As a result, the optical multiplexer 4 can output a signal with a continuous output waveform.

The multiplexed output signal from the optical multiplexer 4 is transmitted as the WDM optical signal output 9 to the optical fiber line via the optical fiber amplifier 5.

According to this embodiment, even when a hit occurs on the optical fiber line, the optical fiber amplifier 5 can be protected from any hit. For this reason, even if a hit occurs on the optical fiber line, and the line recovers from the continuous hit to transmit an optical signal input, the optical fiber amplifier 5 becomes free from a no-signal state and does not abruptly receive an optical signal.

No optical surge (FIG. 2F) is therefore generated, unlike the conventional apparatus, and the optical fiber amplifier 5 can be prevented from any damage.

The compensation optical signal having the wavelength λ1 is multiplexed by a digital multiplexing circuit 11 with an optical fiber line hit warning, repeater number information, local information, and the like which are input via an information input terminal 10. The compensation optical signal oscillated from a laser beam source (not shown) at the wavelength λ1 is modulated by a modulating circuit 12 with an output from the digital multiplexing circuit 11, thereby transmitting the resultant signal to an end office. This allows to receive hit information and local information upon occurrence of, e.g., a hit on the optical fiber line, and to determine the hit zone of the optical fiber line.

As has been described above, according to the present invention, the phase of the main optical signal passing through the main optical path is delayed and synchronized with the phase of the compensation optical signal, thereby multiplexing the main optical signal with the compensation optical signal. Consequently, a continuous optical signal free from any hit can be obtained to suppress an optical surge generated upon occurrence of a hit on the optical fiber line using the optical fiber amplifier.

Even if no hit occurs but the optical fiber line is actually disconnected, the disconnection zone of the optical fiber line can be determined.

What is claimed is:

1. An optical fiber amplifier surge protective apparatus comprising:

optical branch means for branching an optical signal input from an optical fiber line into a main optical signal on a main optical path and a branch optical signal on a branch optical path;

optical delay means for delaying the main optical signal on the main optical path;

light input detecting means for monitoring a level of the branch optical signal on the branch optical path to detect an interruption of an optical signal from said optical fiber line;

compensation optical signal generating means on said branch optical path for generating a compensation optical signal having a wavelength different from a wavelength of the optical signal input when said light input detecting means detects said interruption of said optical signal on said optical fiber line; and optical multiplexing means for multiplexing the compensation optical signal from said compensation optical signal generating means and the delayed main optical signal from said optical delay means, wherein said optical delay means adjusts a delay amount of the main optical signal to coincide with a generation period of a delayed signal from said compensation optical signal generating circuit, and wherein said amplifier receives a continuous optical signal when an interruption occurs and the line recovers from said interruption to transmit an optical signal.

2. The apparatus according to claim 1, wherein said apparatus further comprises:

digital multiplexing means for multiplexing a plurality of pieces of information; and modulating means for modulating the compensation optical signal by an output from said digital multiplexing means, and said compensation optical signal generating means outputs the compensation optical signal from said modulating means to said optical multiplexing means while said light input detecting means outputs a detection signal.

3. The apparatus according to claim 2, wherein said digital multiplexing means performs multiplexing including at least one of line interruption warning information, repeater number information, and local information.

4. The apparatus according to claim 1, wherein the optical signal input comprises a wavelength division multiplexing signal.

5. The apparatus according to claim 4, wherein said light input hit detecting means monitors an output level of a light reception level detecting means to detect an interruption of the optical signal input.

6. The apparatus according to claim 1, further comprising:

an optical amplifier for amplifying an optical signal output from said optical multiplexing means.

7. The apparatus according to claim 1, wherein said optical delay means adjusts a delay amount of the main optical signal to prevent an interruption in an output optical signal from said optical multiplexing means.

8. An optical fiber amplifier surge protective apparatus comprising:

an optical signal branching unit connected to an optical fiber line, said optical signal branching unit splitting an optical signal from said optical fiber line into a main optical signal on a main optical path and a branch optical signal on a branch optical path;

an optical signal delay unit connected to said optical signal branching unit, said optical signal delay unit delaying said main optical signal on said main optical path;

a light input interruption detector connected to said branch optical path, said light input interruption detector monitoring a level of the branch optical signal to detect an interruption of an optical signal from said optical fiber line;

a compensation optical signal generator on said branch optical path connected to said light input interruption detector, said compensation optical signal generator providing a compensation optical signal having a wavelength different from a wavelength of the optical signal input when said light input interruption detector detects said interrupted state of an optical signal on said optical fiber line; and an optical multiplexer connected to said optical signal delay unit and to said compensation optical signal generator for multiplexing the compensation optical signal and the delayed main optical signal from said optical delay unit, wherein said optical signal delay unit adjusts a delay amount of the main optical signal to coincide with a generation period of a delayed signal from said compensation optical signal generating circuit, and wherein said amplifier receives a continuous optical signal when an interruption occurs and the line recovers from said interruption to transmit an optical signal.

9. The apparatus according to claim 8, wherein said apparatus further comprises:

a digital multiplexer for multiplexing a plurality of pieces of information; and a modulator for modulating the compensation optical signal by an output from said digital multiplexer, wherein said compensation optical signal generator outputs said compensation optical signal from said modulator to said optical multiplexer while said light input interruption detector outputs a detection signal.

10. The apparatus according to claim 2, wherein said digital multiplexer performs multiplexing including at least one of providing signal line interruption warning information, repeater number information, and local information.

11. The apparatus according to claim 1, wherein the optical signal input comprises a wavelength division multiplexing signal.

12. The apparatus according to claim 8, further comprising:

a light reception level detector connected to said optical signal branching unit.

13. The apparatus according to claim 12, wherein said light input interruption detector monitors an output level of said light reception level detector to detect an interruption of the optical signal input.

14. The apparatus according to claim 8, further comprising:

an optical amplifier for amplifying an optical signal output from said optical multiplexer.

15. The apparatus according to claim 8, wherein said optical signal delay unit adjusts a delay amount of the main optical signal to prevent an interruption in an output optical signal from said optical multiplexer.

* * * * *